United States Patent
Bier et al.

(10) Patent No.: US 8,341,534 B2
(45) Date of Patent: Dec. 25, 2012

(54) SYSTEM AND METHOD FOR FLEXIBLY TAKING ACTIONS IN RESPONSE TO DETECTED ACTIVITIES

(75) Inventors: Eric Allan Bier, Palo Alto, CA (US); Teresa F. Lunt, Palo Alto, CA (US); Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 289 days.

(21) Appl. No.: 12/718,894

(22) Filed: Mar. 5, 2010

(65) Prior Publication Data
US 2011/0219315 A1    Sep. 8, 2011

(51) Int. Cl.
G06F 3/14        (2006.01)
G06F 3/17        (2006.01)
(52) U.S. Cl. ............... 715/752; 709/225; 705/1; 707/10; 370/229
(58) Field of Classification Search .......... 715/200–277, 715/700–867; 700/701–866; 709/201–229; 705/50–79; 345/30–111; 370/229
See application file for complete search history.

(56) References Cited

U.S. PATENT DOCUMENTS

| | | | |
|---|---|---|---|
| 6,438,594 B1* | 8/2002 | Bowman-Amuah | 709/225 |
| 8,139,481 B2* | 3/2012 | Laulainen | 370/229 |
| 2004/0154022 A1 | 8/2004 | Boss et al. | |
| 2008/0120129 A1* | 5/2008 | Seubert et al. | 705/1 |
| 2008/0294723 A1 | 11/2008 | Daniels et al. | |
| 2009/0254572 A1* | 10/2009 | Redlich et al. | 707/10 |
| 2010/0036929 A1 | 2/2010 | Scherpa et al. | |

FOREIGN PATENT DOCUMENTS

| WO | WO2006028850 | 3/2006 |
|---|---|---|
| WO | WO2007067677 | 6/2007 |

* cited by examiner

*Primary Examiner* — Ruay Ho
(74) *Attorney, Agent, or Firm* — Patrick J. S. Inouye; Leonid Kisselev

(57) ABSTRACT

A computer-implemented system and method for flexibly taking actions in response to detected activities is provided. A trigger in a computing environment is defined and includes at least one of specifying one or more documents, persons, key words, times, and projects associable with the activities of at least one user, and defining one or more actions associable with the activities of at least one such user. At least one of activities, events, and stimuli occurring within the computing environment is monitored in relation to the documents, persons, key words, times, and projects, and to the activities. Action is taken within the computing environment upon activation of the trigger by the at least one activity, event, and stimuli.

24 Claims, 13 Drawing Sheets

FIG. 8

SYSTEM AND METHOD FOR FLEXIBLY TAKING ACTIONS IN RESPONSE TO DETECTED ACTIVITIES

FIELD

This application relates in general to just-in-time message delivery and, in particular, to a system and method for flexibly taking actions in response to detected activities in environments that can include enterprise computing, mass marketing, and user habit surveying.

BACKGROUND

Within a particular group, community, or other social or societal body, ensuring that important information reaches all of the right people precisely at the right time remains a crucial challenge, particularly where the body is working under time pressure, is operating within a competitive market, or where business-critical information is undergoing rapid change, as often occurs in large scale corporate environments.

Within social and societal bodies, business and professional relationships and networking are increasingly influenced and driven by unilateral and bi-directional electronic channels of communication, such as electronic mail ("email"), text messaging, online discussion forums, regular and micro Web logging, Web news feeds, and linked-in Web content. Despite advances in ways to increase the immediacy of electronic communications, information may still fail to reach those individuals who have important or urgent information needs due to poorly timed or completely missed message delivery, or because an action, such opening a calendar and highlighting a particular day, failed to occur.

Similarly, within the corporate setting, users are at times requested to complete surveys and other requests for information. Information requests include opinion polls, work performance questionnaires, project reviews, and the like. These requests are not always circulated at times when most effective collection of information may occur. For instance, the users may be tied-up with other work, or find the information requested redundant or cumulative to information previously provided. The challenge of both timing information dissemination and collection for optimal effect and efficiency increases with the sophistication and complexity of the social bodies involved and of the underlying activities, such as ensuring consistency in and quality of business practices with global customers, despite differences in time zone, geography, culture, customs, and language.

Several situations may arise that result in mistimed or failed message delivery. For instance, a message may fail to be delivered to the correct recipients. In a large company, for example, the appropriate communication channels for each employee with a need-to-know may be unknown to a message sender. Indifferently sending a message to former employees is ineffective, while newly-hired or transferred employees may unwittingly be left off recipient lists. Similarly, a message sender may be unaware of the scope of business divisions within which to send a communication for a particular topic and may inadvertently miss work groups who have an interest in the underlying information. Despite the message sender's best intentions, the message omits those work groups as recipients and the opportunity to ensure that important and urgent information needs are met is lost.

As well, message or survey delivery alone, even when provided to all or most of the potential recipients who respectively share a need for or provide a source of the underlying information, cannot guarantee effective or appropriate usage or provisioning of the information conveyed or sought. For instance, a message that arrives too early, possibly long before the message is actually needed, may be read, filed away with other messages, and subsequently deleted, re-filed, or forgotten, unless the recipient takes separate action to set up a reminder or other trigger to occur at some future point in time closer to when the information becomes germane. Similarly, at the time of message arrival, a message recipient may be working on another project or be distracted by other activities, thereby inadvertently ignoring or miscategorizing the message. Finally, a message that arrives too late may completely miss a deadline or an opportunity for taking action, and thus be of meager value to the recipient.

Accordingly, what is needed is an approach to delivering communications, requesting information, and, more generally, taking various actions within an organization, as well as delivering messages to a set of people determined dynamically by a set of rules. Communications, whether as outgoing messages or information requests, should be timed to arrive just-in-time, that is, when the communication has optimum potential for getting the attention of and to be of optimal usefulness to each recipient, as well as to the requester or sender.

SUMMARY

A system and method for delivering messages to or, more broadly, undertaking some type of action with respect to a set of dynamically-identified people is provided. A sender creates a message (or defines an action) and uses software to create a set of rules that dynamically define WHO will receive the message and WHEN the message will be delivered. The rules for WHO can receive the message may depend upon the observed activity of people around documents and any connections between those people and activities, events, persons, key words, times, projects, and so forth. The rules for WHEN will generally depend upon the observed activity of the persons identified by the WHO rules. Physical location, which can be determined by GPS and other tracking technologies, can be used as input to a WHO rule or a WHEN rule.

In particular, these rules will depend on what people do relative to their documents, events, other persons, times, projects, key words, and topics, for instance, what annotations are made, what documents are read, and so on. A client-installed version observes the activity of users. When a user identified by a WHO rule performs an activity specified by a WHEN rule, the message is delivered (or the action is taken) at that time. The WHO and WHEN rules can be combined in a single set of rules that identify both WHO and WHEN. Additionally, the rule for defining of who will receive a message and when the message will be delivered can be combined.

One embodiment provides a computer-implemented system and method for flexibly taking actions in response to detected activities. A trigger in a computing environment is defined and includes at least one of specifying one or more documents, persons, key words, times, and projects associable with the activities of at least one user, and defining one or more actions associable with the activities of at least one such user. At least one of activities, events, and stimuli occurring within the computing environment is monitored in relation to the documents, persons, key words, times, and projects, and to the activities. Action is taken within the computing environment upon activation of the trigger by the at least one activity, event, and stimuli.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 8 is a functional diagram showing, by way of example, Jane checking her calendar to plan a meeting.

DETAILED DESCRIPTION

Activity-Triggered Messaging Environment

Figure 1:
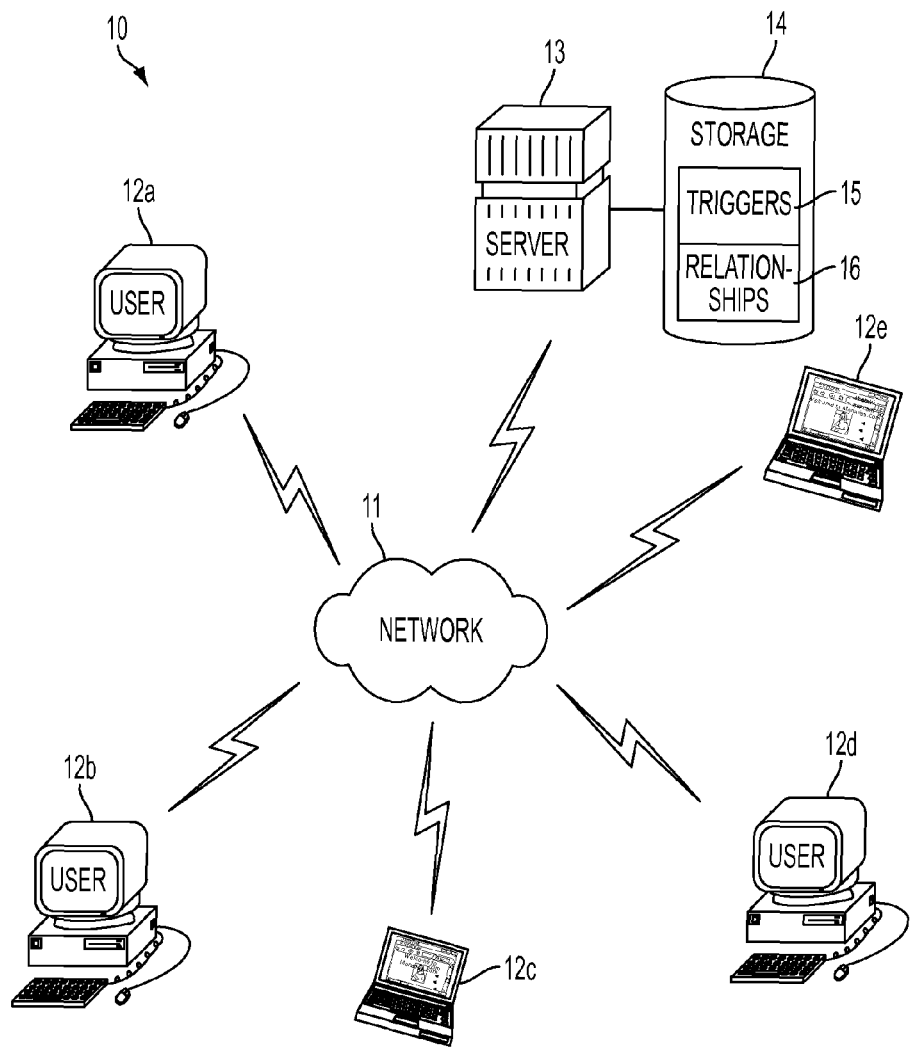
FIG. 1 is a block diagram showing an environment for flexibly taking actions in response to detected activities in accordance with one embodiment.

Electronically-transmitted communications, particularly email, text messaging, online discussion forums, regular and micro Web logging, Web news feeds, and linked-in Web content, are frequently created and shared between physically-separated users working collaboratively through a networked computing environment, such as a corporate enterprise or mass marketing arrangement. Each communication contains content, typically text, and can also include, for example, annotations; attachments; embedded content, including audio, video, and streaming media; and linked-in Web content, such as referenced through hyperlinks. FIG. 1 is a block diagram showing an environment 10 for flexibly taking actions in response to detected activities in accordance with one embodiment. The environment 10 can include enterprise computing, mass marketing, or other interoperative electronic environments within which a set of users that, execute word processing, spreadsheet, email client, presentation, Web browsing, and other productivity applications on stationary or mobile programmable computing systems or devices 12*a-e*, including personal computers, mobile devices, digital media players, smartphones, and other network-connectable machines. On each computing system, the applications are executed under the control of a windowed operating environment, such as the Windows operating system, licensed by Microsoft Corporation, Redmond, Wash., the OS X operating system, licensed by Apple Inc., Cupertino, Calif.; mobile and smartphone rating systems, such as the iPhone operating system, also licensed by Apple Inc., and the Symbian operating system, licensed by Symbian Foundation, London, UK; as well as Linux-based operating systems, available, for instance under the GNU General Public License. The windowed operating environment provides a graphical user interface that presents content within one or more application windows.

The computing systems are interconnected over a network 11, which provides access to the other computing systems and to diverse and distributed information repositories, as well as other electronically-stored or -accessible resources. A message delivery platform on a centrally-located enterprise server 13, similarly interconnected over the network 11, facilitates activity-triggered message delivery between the users of the various computing devices 12*a-e*, as first explained through an example scenario with reference to FIGS. 2-12 and as further described below beginning with reference to FIG. 13. In a further embodiment, the environment may lack a centrally-located enterprise server, and messages are instead be transported, in encrypted form if necessary, in a peer-to-peer fashion among inter-operable message delivery platforms on computers in the network. Received messages are decrypted and displayed to the user when the who and when rules find a match.

Message delivery is but one form of action that can be automatically undertaken by the system. Other, more general actions could also be taken upon the tripping of a rule-based trigger, which can include sending user surveys, questionnaires, and other forms of requests to collect user information that are automatically sent to the user or displayed on a user's device based on activity-triggers. However, for clarity of discussion, message delivery will be specifically discussed.

The enterprise server 13 can also provide centralized storage of information 14, as can other devices situated within or external to the immediate enterprise environment 10. In particular, the enterprise server 13 is operatively coupled to a storage device 14 in which information, such as triggers 15 and their relationships 16 to activities, for instance, between people, companies, documents, projects, times, places, and topics, can be maintained for use by the computing devices 12*a-e* and other devices. In a further embodiment, storage of information is de-centralized. Instead, persistent storage of information about connections between people, companies, documents, and so forth can be stored on one or more computers in the network, for instance, in a peer-to-peer fashion.

Both the computing devices 12*a-e* and the enterprise server 13 include components conventionally found in general purpose programmable computing devices, such as a central processing unit, memory, input/output ports, network interfaces, and non-volatile storage. Other components are possible.

EXAMPLE

The computing devices 12*a-e* increase the immediacy and effectiveness of electronic communications. However, information may still fail to reach recipient users of the computing devices 12a-e that each have important or urgent information needs, which may exist outside the knowledge or awareness of a message sender. FIGS. 2-12 are functional diagrams showing, by way of example, a scenario demonstrating activity-triggered communications through the system of FIG. 1. For purposes of illustration, the scenario concerns communicating guidance on sales from Company A to Company X.

Figure 2:
FIG. 2 is a functional diagram showing, by way of example, an activity space for a particular task for a user named Jane concerning dissemination of an alert message to fellow users.
Figure 3:
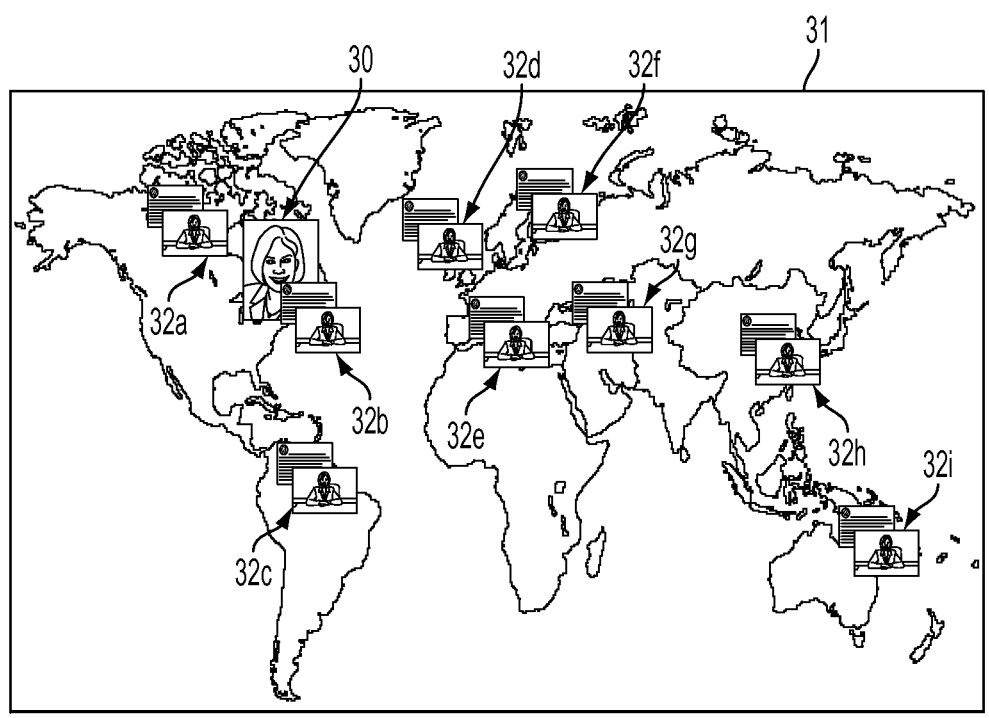
FIG. 3 is a functional diagram showing, by way of example, automatic propagation of Jane's alert message to the fellow users at other sites.

Referring first to FIG. 2, an activity space 20 for a particular task is depicted concerning dissemination of an alert message 22 to fellow users. The activity space 20 visually organizes emails, Web pages, and other information on behalf of its members 21. The activity space 20 is being used by a sales manager, named Jane, who has zoomed into the "Announcements" category of information. Jane is writing an alert message 22 concerning Company X sales that she should like her sales people to see, but she wants to disturb her sales people with the alert message 22 only when their activities indicate that they are writing a proposal for Company X. Referring next to FIG. 3, Jane's alert message 22 automatically propagates to other sites 32a-i at which sales people work throughout the enterprise 31 from Jane's site 30. Her message 22 is propagated by the enterprise server 13 or computing devices 12a-e via electronic communication to other enterprise servers or personal devices at other locations around the company. However, actual delivery of Jane's message 22 to a particular user does not occur until the appropriate context and time is detected; in this case, that situation occurs when the system detects that an employees is likely writing a sales proposal for Company X. In addition, the physical location of users can be determined by GPS and other tracking technologies and be provided as information used by the system to gauge message delivery timing and related considerations, such as coinciding in physical location with another user at the same time, for instance, when both are attending the same meeting.

Figure 4:
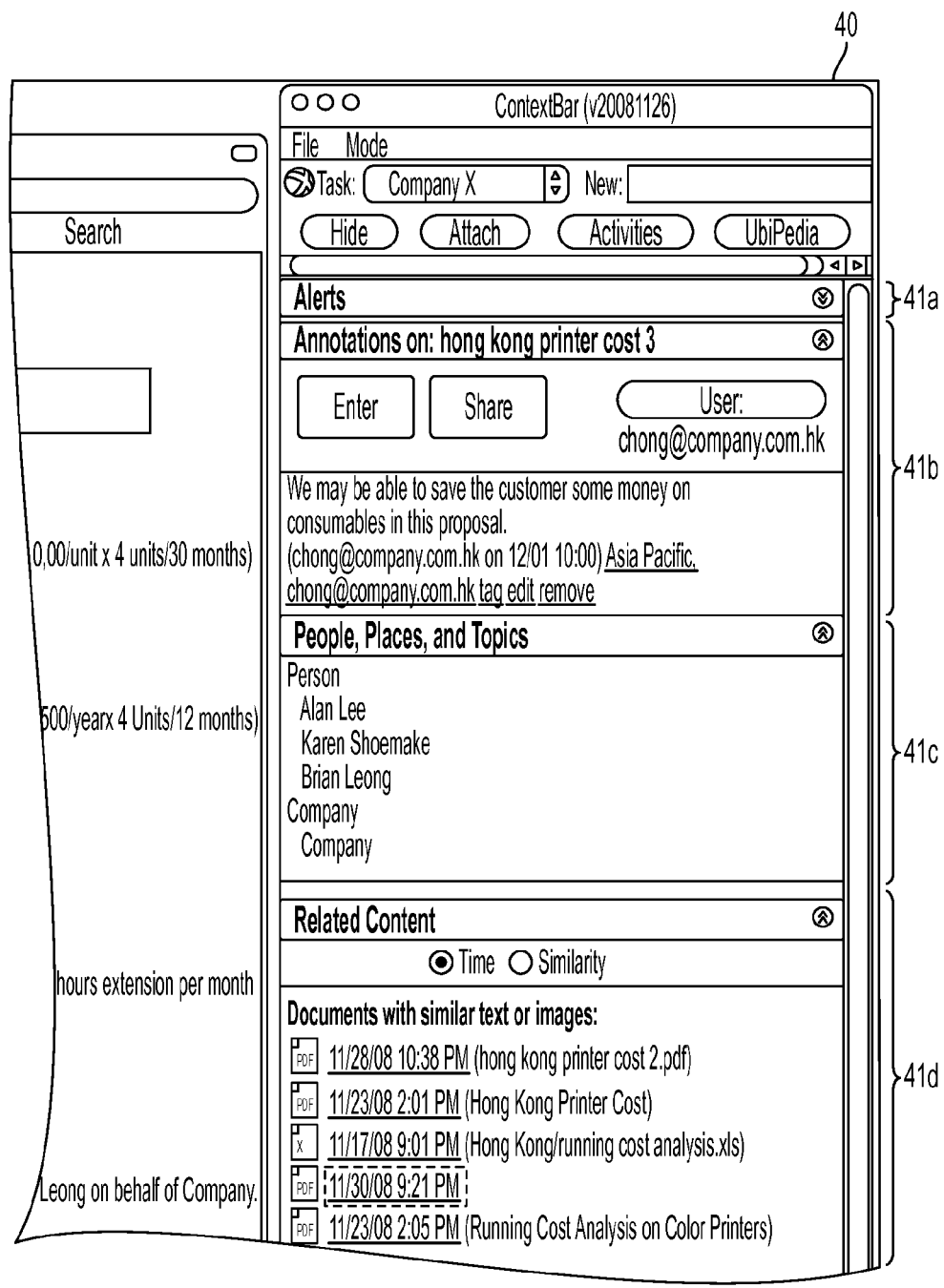
FIG. 4 is a functional diagram showing, by way of example, a context-sensitive sidebar window for an anonymous sales person in Hong Kong.

The sales people within the enterprise should not receive Jane's alert message 22, unless the circumstances are both relevant and timely. Referring next to FIG. 4, another user, an anonymous sales person in Hong Kong, is working on sales documents, while a context-sensitive sidebar window 40, such as described in commonly-assigned U.S. patent application, entitled "System and Method for Providing Context-Sensitive Sidebar Window Display on an Electronic Desktop," Ser. No. 12/570,733, filed Sep. 30, 2009, pending, the disclosure of which is incorporated by reference, is open. The sidebar window 40 is providing several kinds of context 41a-d, respectively including "Alerts," "Annotations on: Hong Kong printer cost," "People, Places, and Topics," and "Related Content." In particular, the "Alerts" section 41a of the sidebar window 40 is collapsed because this particular sales person is not currently working on a proposal for Company X.

Figure 5:
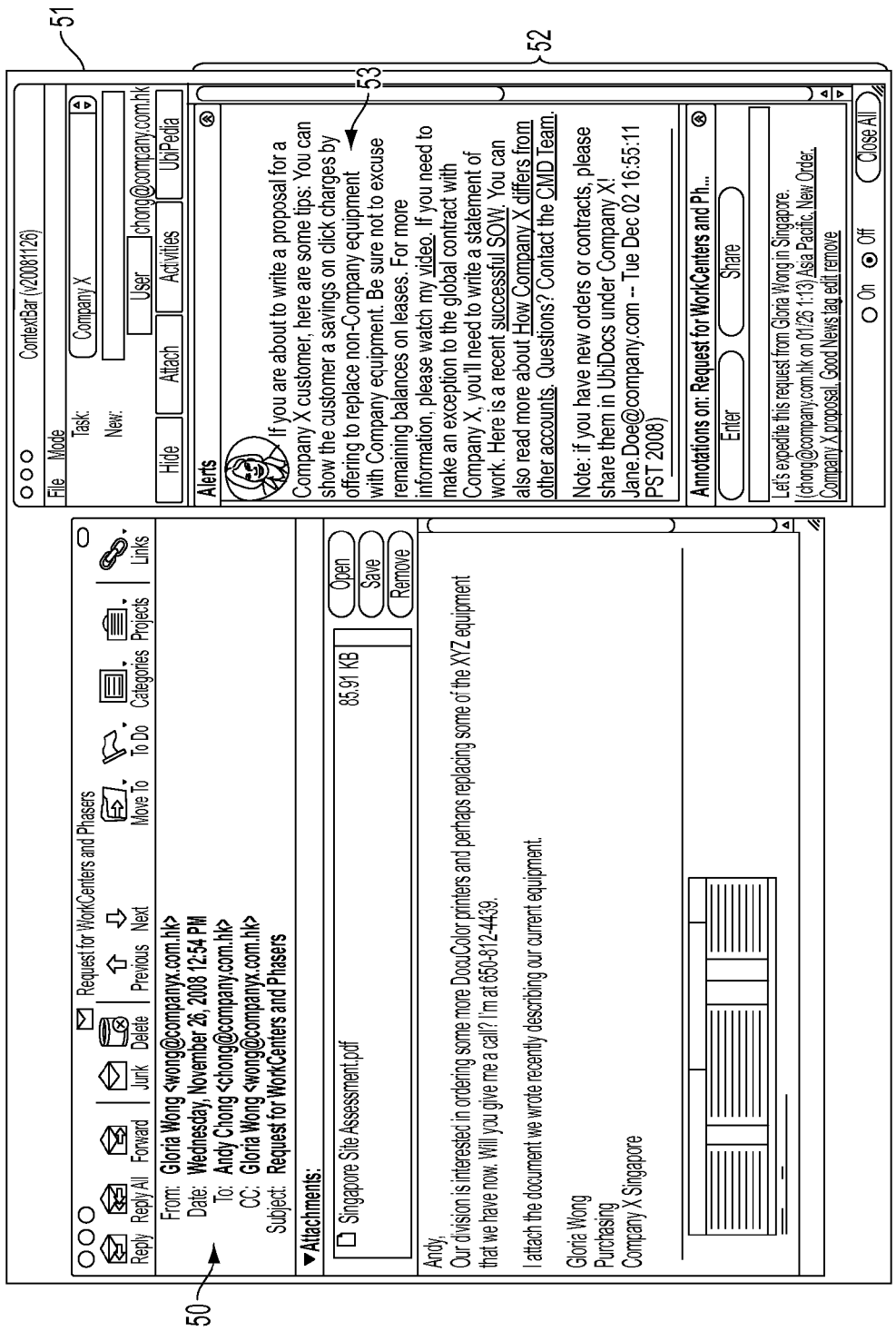
FIG. 5 is a functional diagram showing, by way of example, another sales person in Hong Kong, named Andy, who has received an email with an order.

Conversely, the sales people within the enterprise that are actively working on sales proposals for Company X should receive Jane's alert message 22 in a well-timed and context-sensitive manner. Referring next to FIG. 5, another sales person in Hong Kong, named Andy, has received an email with an order 50 from Company X for acquisition of equipment from Company A. As a result of this order 50, he will soon need to write a sales proposal for Company X. His sidebar window 51 detects the situation in regards to the Company X sales proposal. The "Alerts" section 52 of the sidebar window 50 opens and Jane's alert message 53 is displayed. The message 53 includes links to other materials that are relevant to the situation, such as sample documents and videos.

Figure 6:
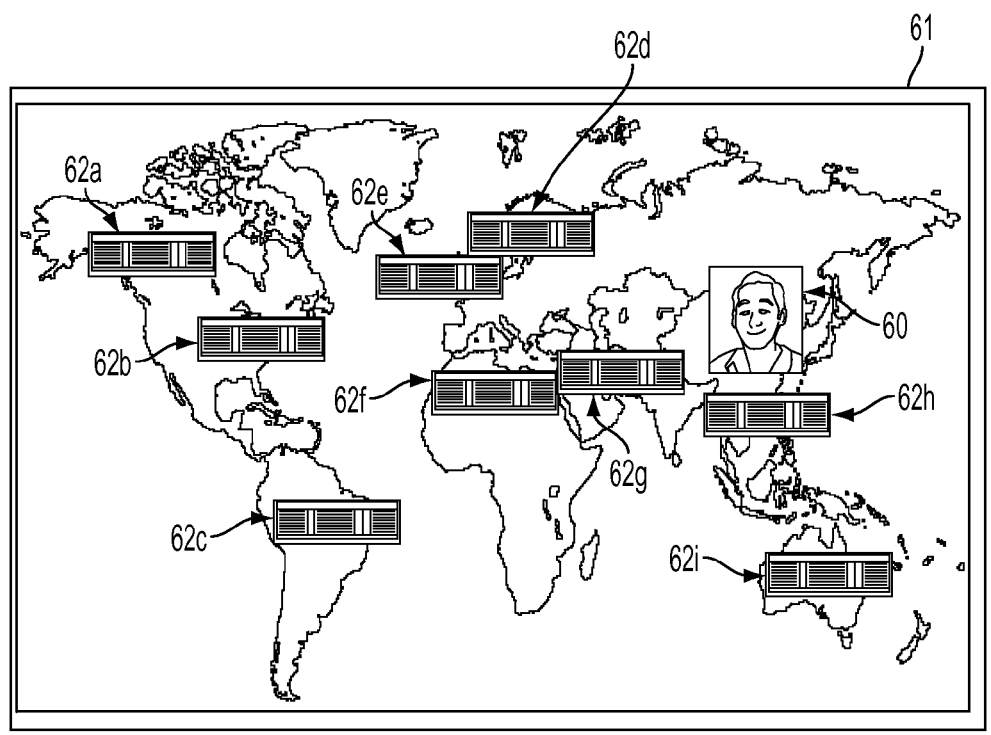
FIG. 6 is a functional diagram showing, by way of example, Jane's alert message annotated to a document written by Andy.

Thus, Andy has been alerted through just-in-time display of an alert message germane to writing a sales proposal for Company X. Referring next to FIG. 6, Andy has annotated a document with an annotation 60 that indicates a desire to share the contents of the annotation 60 with Jane and other sales managers around the company, who may be located anywhere around the world. The system automatically propagates the annotated document from Andy's site in Hong Kong to sites 62a-i around the company 61 (and, world), where the annotated document will be accessible by Jane and to other sales managers when they view a summary of recently shared documents, like the document discussed below with reference to FIG. 12.

Figure 7:
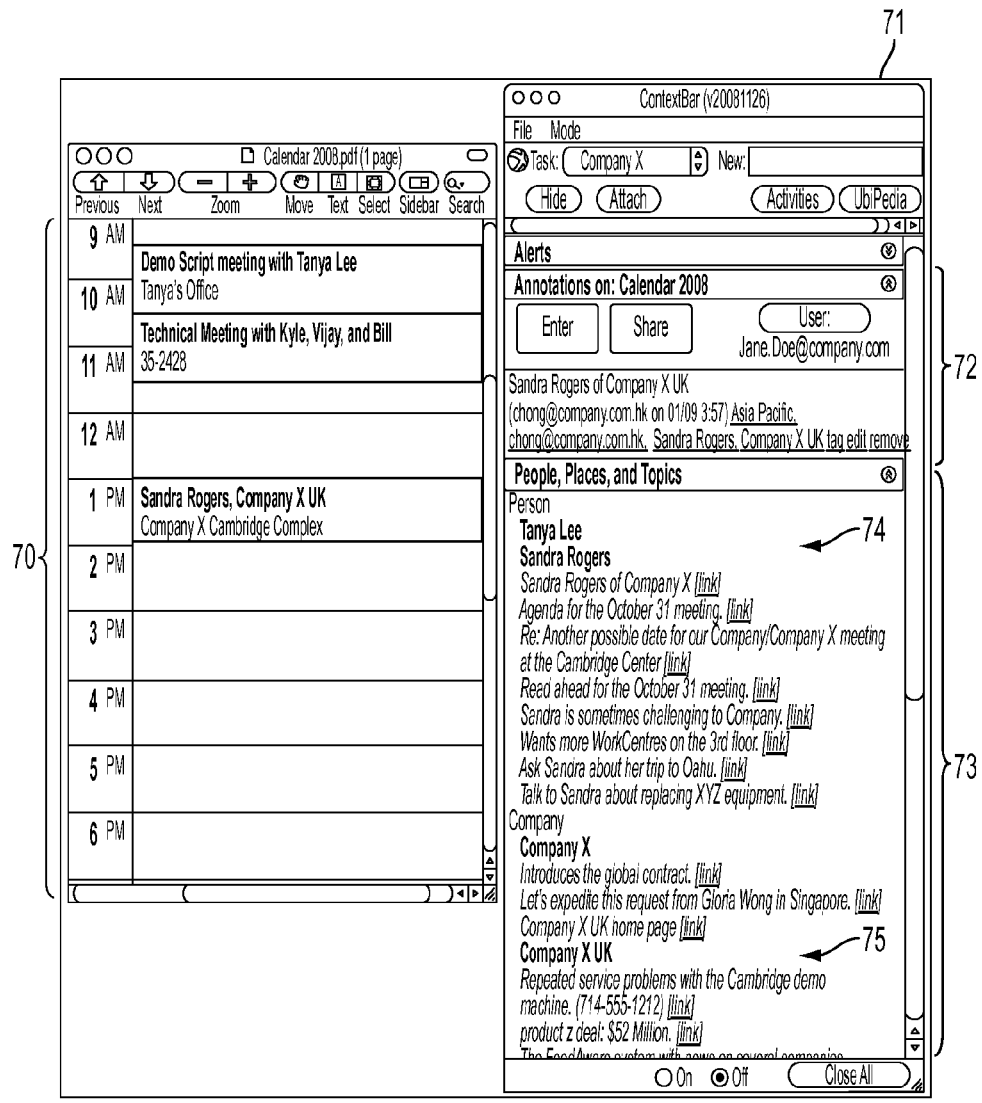
FIG. 7 is a functional diagram showing, by way of example, Jane receiving her own copy of Andy's annotated note.

Referring next to FIG. 7, we see Jane consulting her calendar 70 while using a sidebar window display 71. The system detects that she is planning a meeting and displays information using, for instance, the "Annotations" area 72 and "People, Places, and Topics" area 73 in the sidebar window display 71. The system dynamically identifies context, including information about the person 74, Sandra Rogers, that Jane is meeting with, and the company 75, Company X, at which Sandra works. Both of these kinds of information 74, 75 are displayed, in summary form, in the "People, Places, and Topics" area of the sidebar window display 71.

Figure 8:
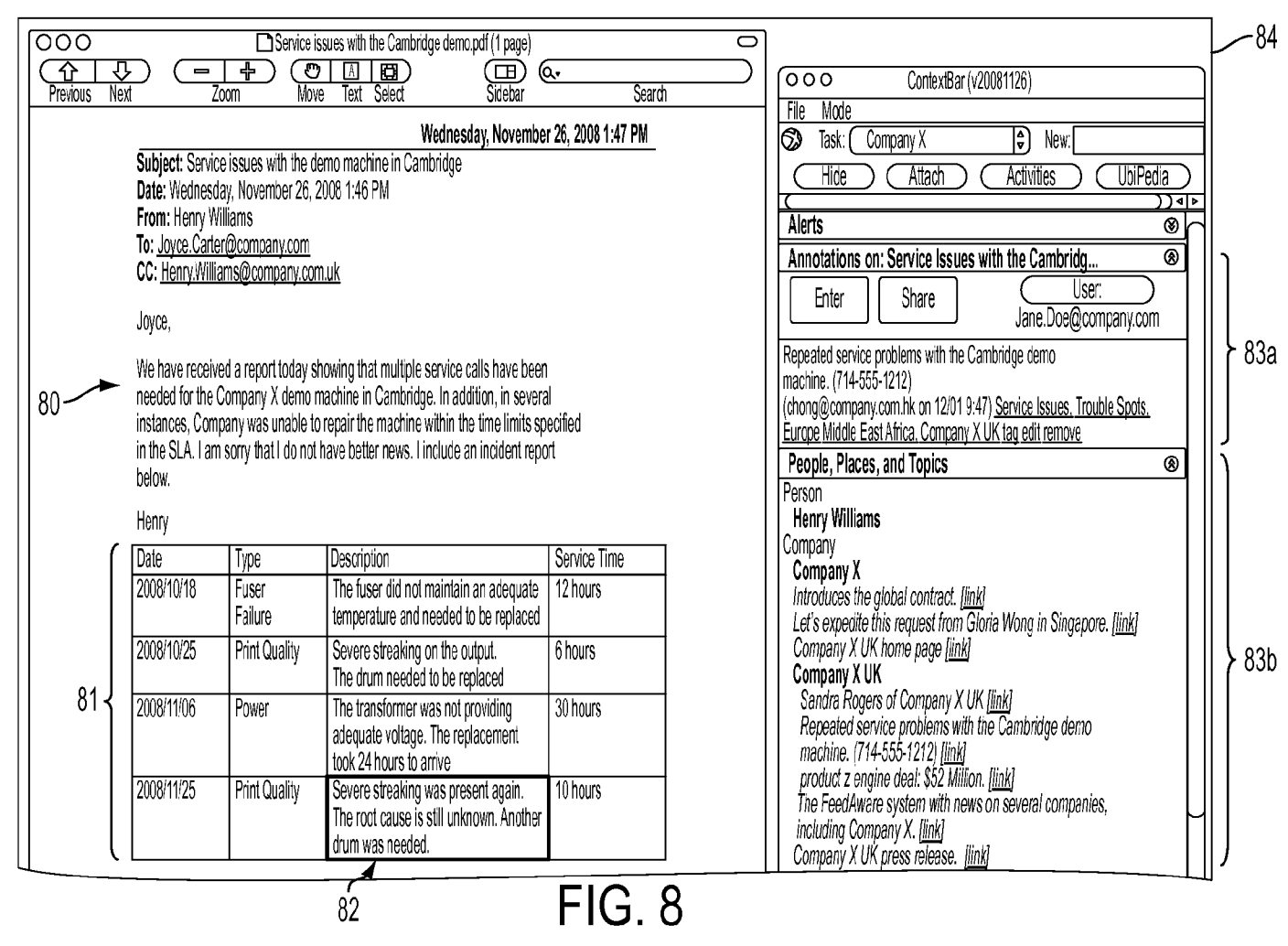

Referring next to FIG. 8, Jane has clicked on one of the links provided in her sidebar window display 71 (shown in FIG. 7) to open a document 80 recommended. The document 80 opens for viewing in a traditional application, showing information 81 relevant to the upcoming meeting. In this case, a document 82 is displayed showing a problem that a customer is having with some equipment at Company X; Jane will want to address this issue at the meeting. Opening this new document creates a new activity context 83a within the sidebar window display 84, which displays information relevant to the document being viewed, including information 83b about Henry Williams, the author of the document 82.

Figure 9:
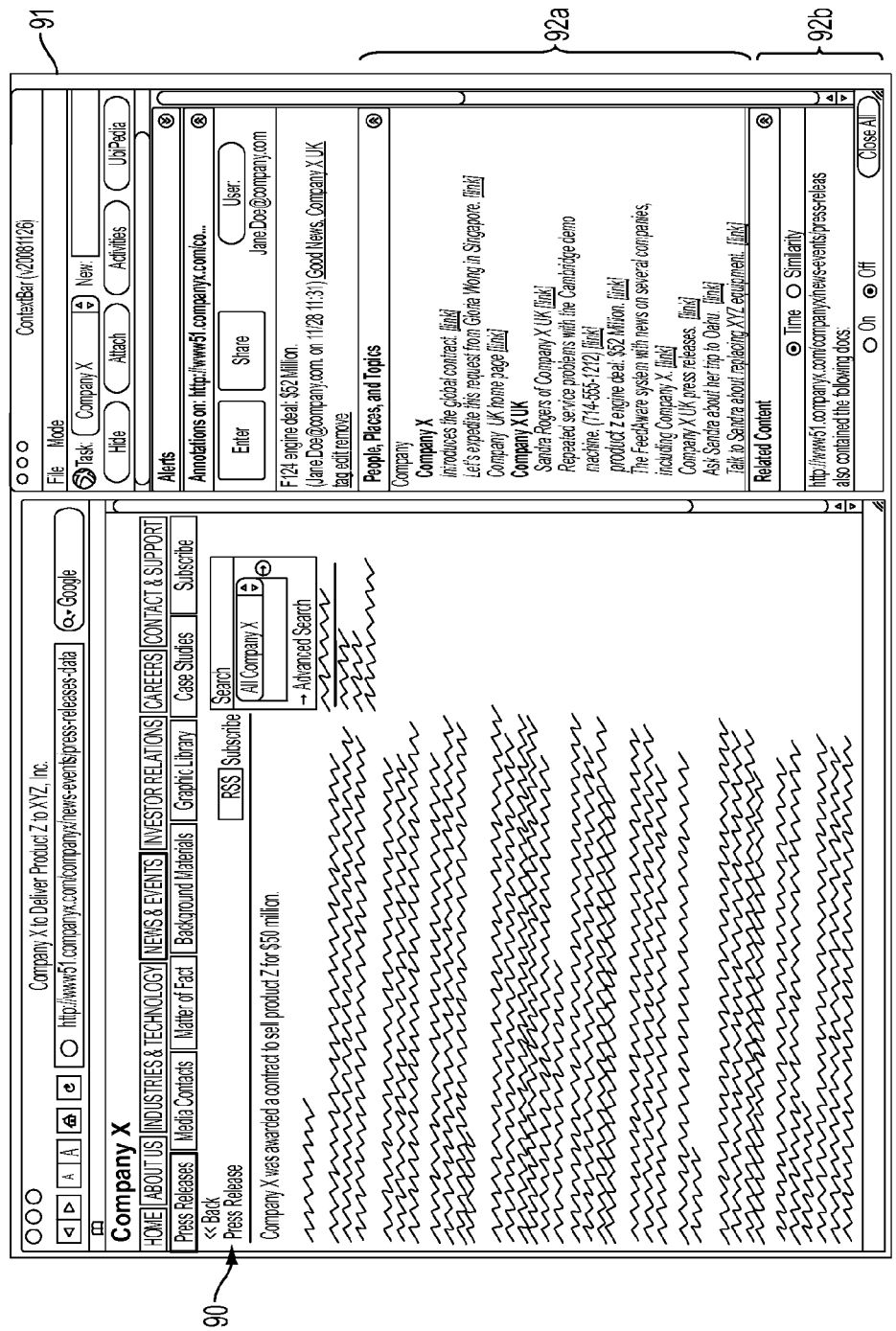
FIG. 9 is a functional diagram showing, by way of example, a sidebar window triggered by Jane's upcoming meeting and a notification pushed to Jane.

Other information may also be relevant and can be automatically identified and displayed through the sidebar window display. Referring next to FIG. 9, Jane has selected an article 90 from the sidebar window display 91 describing some good news for Company X; Company X has won a large new contract. Again, this information will be useful for Jane in her meeting, as Company X may be growing as a result of the contract and may need more equipment from Jane's company. Once again, the sidebar window display 91 adjusts its display to show additional information 92a, 92b related to the article 90, including a comment about the article 90 made by another member of Jane's sales group.

Figure 10:
FIG. 10 is a functional diagram showing, by way of example, including a flag within a task in Jane's activity space.

Referring to FIG. 10, Jane needs to prepare for her weekly meeting with her own staff. For this meeting, she needs to have a broad understanding of the important events related to customers in different parts of the world. She uses the activity space tool 100 that is part of the system as a kind of daily digest overview, which enables Jane to review the information that has been gathered as a result of her own activities, activities of her staff, and activities of associated sales personnel around the world. In particular, this view 101 shows information that has been collected by her system, annotated by her, annotated by other members of her team, and so forth. The activity space tool 100 provides an overview, organized geographically in this view, of emails, documents, and comments collected about customers, proposals, and contracts. In this view one color (green) is used to highlight good news and another color (red) is used to highlight bad news. Among other news, this view 101 shows the new order 102 received by Andy in Hong Kong. This information has automatically been sorted into the Asia Pacific region 103.

Figure 11:
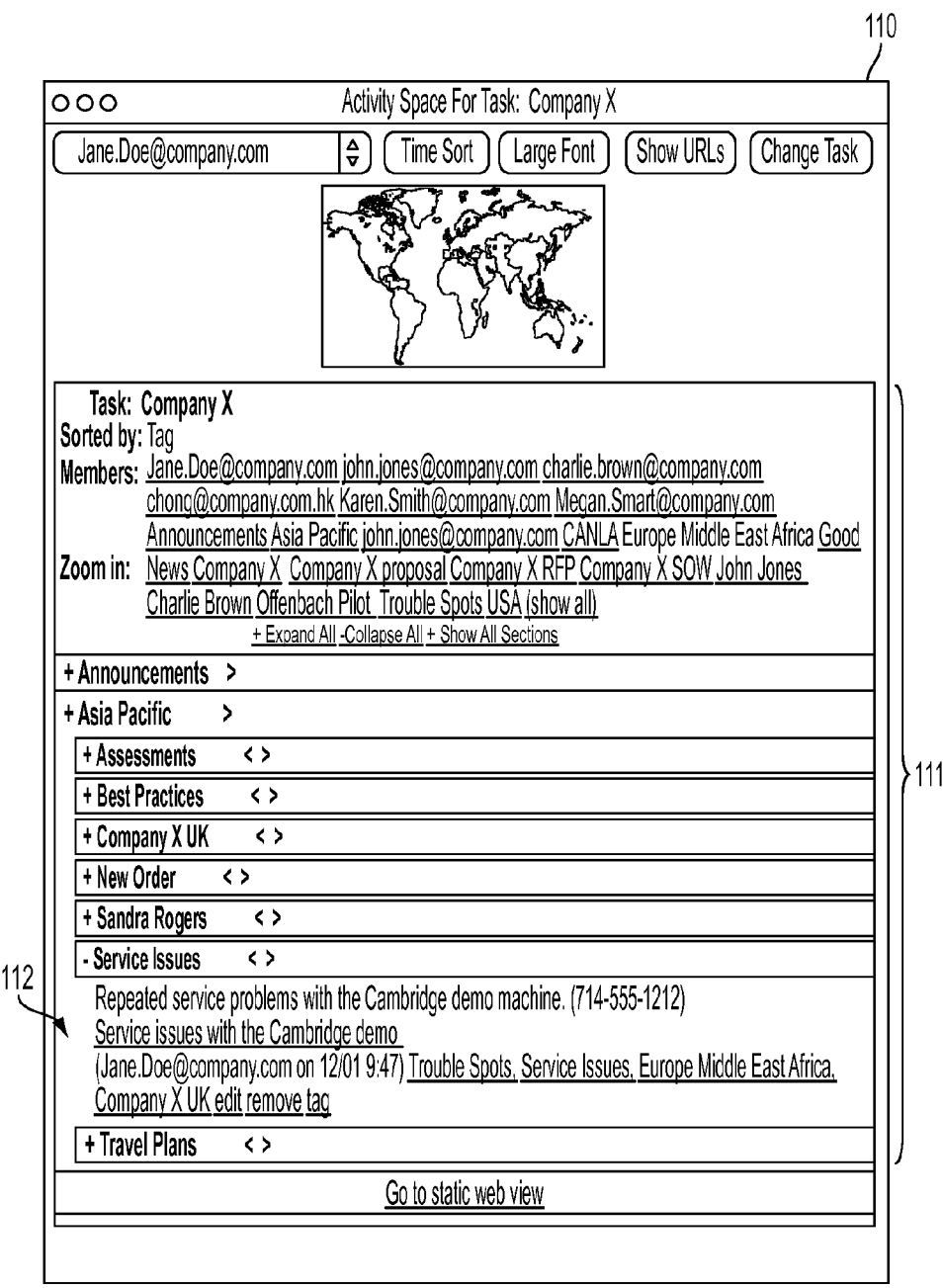
FIG. 11 is a functional diagram showing, by way of example, a summary of all of the information that has been collected.

Likewise, referring to FIG. 11, within her activity space 110 for a task 111, Jane reads a summary 111 of an equipment problem 112 in the European region. This same information was presented to her automatically when she was planning her meeting with Company X, as described above with reference to FIG. 7.

Figure 12:
FIG. 12 is a functional diagram showing, by way of example, how Jane can zoom into different parts within a task in her activity space.

Next, referring to FIG. 12, Jane expands the "New Orders" section 120 within the Asia Pacific section 121 of her activity space 122 for a task 123 to make sure that she is up-to-date with any new business in the Asia Pacific region.

Going forward from closure of the scenario, Jane is better prepared to work out a sales proposal with Company X, and the information automatically presented to her by the system, 20 particularly via her sidebar window display, is provided at a time and in a context that are both appropriate and relevant, such as during the scheduling of a meeting with a particular customer.

Method

In the example scenario described above with reference to FIGS. 2-12, both Jane and Andy benefited by the context-sensitive and system-gauged delivery of messages based on their on-going activities. Message delivery is one form of action that can be automatically undertaken by the system. As well, based on a user's actions, by way of example, the system may offer to:

(1) move an email message to a specific message set;
(2) copy a document into a shared (or private) folder in a repository;
(3) add a To Do entry into a user's private task list;
(4) add a calendar entry in a shared or private calendar;
(5) create a new document, based on an appropriate template, for the user to edit;
(6) copy a document to a user's laptop or smart phone; or
(7) sending user surveys, questionnaires, and other forms of requests to collect user information.

Other, more general actions could also be undertaken upon the tripping of a rule-based trigger.

Figure 13:
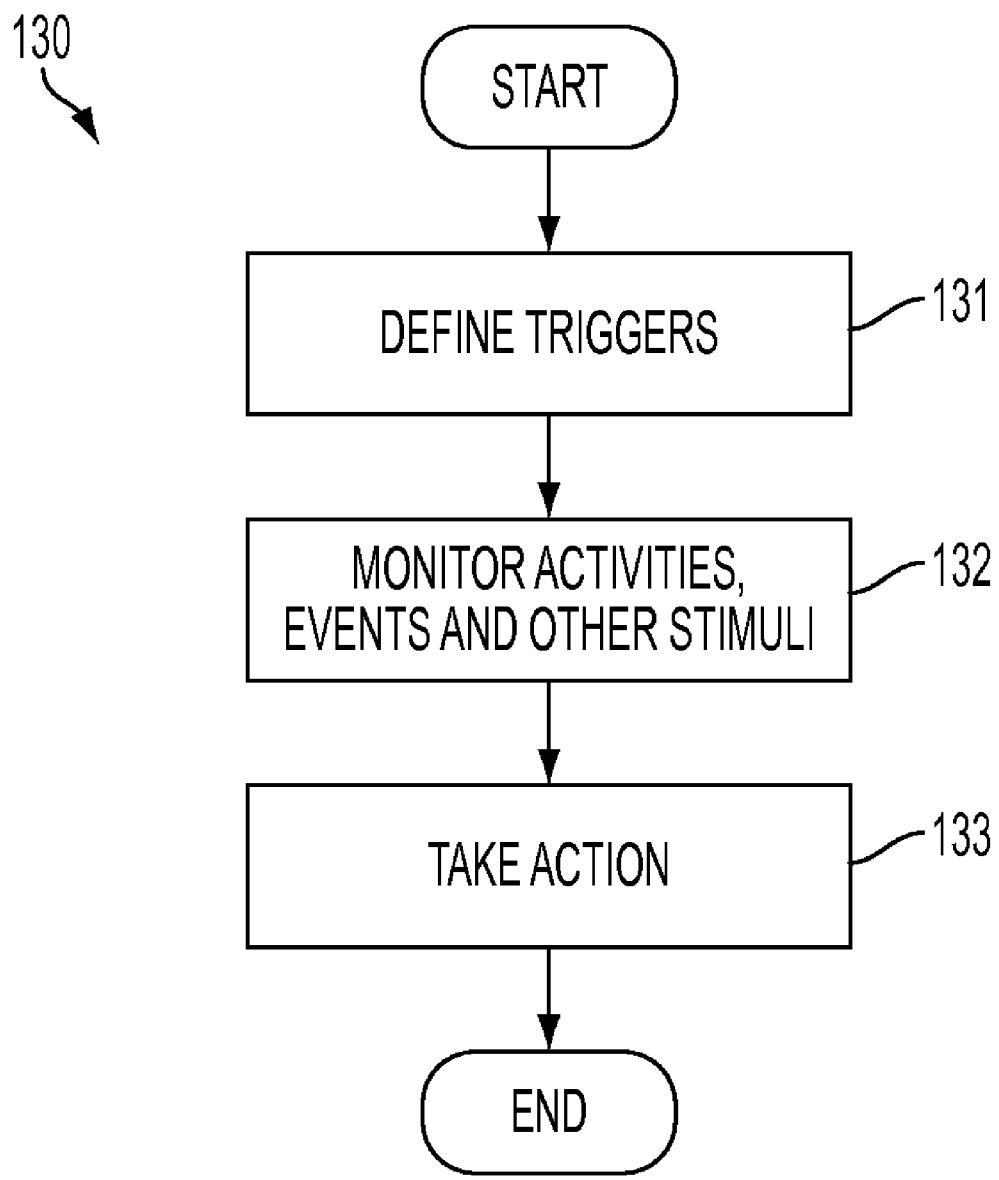
FIG. 13 is a flow diagram showing a method for flexibly taking actions in response to detected activities in accordance with one embodiment.

Message delivery, as well as more generalized forms of action, occur in a rule-based fashion. FIG. 13 is a flow diagram showing a method 130 for flexibly taking actions in response to detected activities in accordance with one embodiment. The method 80 is performed as a series of process or method steps performed by, for instance, a general purpose programmed computer, such as a personal computer.

Triggers

There are three principal operations performed for each message to be delivered at distinct points in time. First, one or more triggers are defined (step 131), which may be defined independently of any particular message-to-be-delivered. The exact nature of a trigger may depend upon either a specific document, person, key word, time, project, and so forth. For example, in a general sense, a user can take action merely by using computer applications or by working on stored documents. Actions are therefore performed on the documents that are associated with, or to communicate with people, who are in turn associated with, or on behalf of a project that is associated with a specific class of documents, people, key words, times, projects, and so on. Thus, in terms of taking action, the user interacts with a person, document, or other object that is associated with a user's activity, or with a general class of such documents, people, key words, times, or projects. The trigger may result from the actions of a single user, interacting with computer software and with people in a way that is mediated by computer software, or by multiple users performing activities that together constitute a trigger. Moreover, the general class of documents, people, key words, times, or projects may be defined with reference to relationships between these things, such as "any document authored by Bill," "any topic related to smart phones," "any project of which Terry is a member," "any person who works for Company C," "any document written by an employee of Company C that mentions a product from Company A."

A trigger can also depend on just one person, or on multiple persons. For example, in a workflow scenario, Person A and his manager, Person B, must both sign off on an approval form before a trigger is activated. As a further example, Person C at Company X has sent Form F to Person D at Company Z. Person D has filled in the information requested by Form F, which has then been sent back to Person C. In both examples, the system may send reminders about what next step need be taken, and how to perform that next step, or the system may automatically enter a note that a sub-task has been completed in an online database, Wiki page, spreadsheet, and so forth.

In practice, a trigger is an activity-, event-, or stimuli-based message delivery rule, which causes a message to be sent or opened in response to an activity, event or other stimuli, usually as performed by another user, although the message-originating user may also become the recipient of a message. For instance, a message author may wish that an action be taken when his or her own activities match a trigger pattern, which gives that user a way to send himself or herself a reminder, or to make sure that useful information will be displayed at the right time such that the user can put off reading information that is not yet needed. Similarly, message delivery could be triggered if person A sends a message to person B or to any person in Company C. As well, a rule could trigger if person A receives a message from any of those classes of people, that is, person B or any person in company C. Message delivery could also be triggered for person P, when person P sends, receives, or reads an email on a particular topic. This topic could be specified by a set of key words. However, even if the email does not contain those exact words, the rule could trigger if words with similar meaning were included, as computed using latent semantic analysis. Still other forms of triggers for the originating user or other users are possible.

Triggers are rules, which are associated with activities, events, and other stimuli occurring within the environment, including documents, persons, key words, times, projects, and so forth, as well as any relationships occurring there between. Different messages may be associated with the same stimuli. A trigger can be a simple activity, such as creating or opening a document, email, or Web page. Other simple activities may non-exclusively include moving to a particular room or place, typing a particular word or phrase, clicking a mouse cursor on a particular object, printing a document, starting up an application, or logging into a particular database, system or Web site. A trigger may also be a sequence of simple activities, such as authoring a document followed by emailing the document. The exact sequence of the activities that constitute a trigger may be determined using machine learning algorithms that have been trained to detect higher level activities, such as preparing a new sales proposal. Other types of triggers are possible.

Some triggers may be based on the context or metadata of a document that a recipient is working on. For example, the rule may identify characterizing text from the document or metadata about the document, an abstraction of the content of the document, or specific document topics and key words using, for instance, latent semantic analysis, as implemented using latent Dirichlet allocation (DLA) and related approaches. To define a trigger, a user may need to specify one or more of these criteria. One or more of the criteria may be required to define a context sufficient to define a trigger.

Similarly, the activities of a single user, or the activities of multiple users may be required to define the context.

To reduce the effort needed to define triggering rules, the system may provide automatic methods for constructing rules that are commonly needed. For example, the user may wish to send a message at the time that a recipient is working on a task, which is related to that message. In this case, the system may examine the content and metadata of the message itself and construct a rule to trigger on related content, such as content with identical or similar metadata, entities, key words, or topics. Similar yet non-identical key words, topics, entities, and so on may be computed using a technique, such as latent Dirichlet allocation (DLA) or latent semantic indexing.

To define a trigger, a user may need to specify one or more of the criteria. One or more criteria may be required to define a context sufficient to define a trigger. Similarly, the activities of a single user, or the activities of multiple users may be required to define the context. Criteria for defining a trigger, may include these aspects of a user activity:
 (1) which applications are in use by that user, for instance, email, word processing, presentation creation, spreadsheet, Web browser, and so forth;
 (2) the topics of the documents being read or modified by the user, for example, companies, people, contracts, dates and times, projects, products, and so on;
 (3) the context of the documents used by that user, including whether or not those document are connected to people, documents, projects, times, or places within the environment. For example, a document authored by Jane may be a trigger; and
 (4) operations in which the user is engaged, for instance, creating a new document, reading an existing document, sending an email, storing a document in a shared repository, changing an item in a database, and so forth.

Other user-specific criteria are possible.

Activities, events, or other stimuli need to occur in a context that indicates that the message should be delivered. Another way to specify a trigger rule is to specify a particular item of interest and a class of interactions with an item that a user might undertake. Here, the item might be a document and the interaction might be the act of modifying that document. Other interactions include access, movement, deletion, reply, forwarding and so forth. Such trigger rules could specify a class of documents, instead of a particular document. For example, the message sender could specify all document that mention a given topic or characteristic key words. The topics and characteristic key words can be matched to other topics or key words extracted from data of other users. When the data of the other users is used, a message delivery trigger is tripped. For example, using the name of a particular customer or key word in a document being written by another user could trigger a policy driven-rule that results in an instructional message being dispatched to that user.

In general, a graph of context is maintained to represent relationships between people, companies, documents, projects, times, places, topics, and other entities, constructs or activities. A trigger can be conditioned on the contents of this graph of relationships as the rule relates to an activity within the graph. Each relationship can be direct, when an action is taken directly on a pre-specified document, person, key word, time, project, topic, and so on, or indirect, when an action is taken on an entity strongly connected by a path that includes at least one connected edge of the graph of context with a pre-specified document, person, key word, time, project, topic, and so forth. For example, a rule may be triggered if a document is opened for reading that is explicitly linked to Company C by an edge within the graph. Moreover, whether an activity is considered a trigger can depend, for instance, upon the specific people, documents, or locations involved. For example, a rule about writing a proposal for Company C may depend on receiving an email from a person in Company C, opening a document that mentions Company C, or traveling to a building owned by Company C. Other forms of expressing the relationships are possible.

Monitoring

Second, activities, events, and other stimuli occurring within the environment are monitored (step 132). In a further embodiment, the activities, events and other stimuli can occur outside the immediate environment. In general, the actions of other users in or objects within the environment cause activities, events and other stimuli to occur, which can, in turn, trigger message delivery. Activities, events and stimuli could also be caused by the message sender himself or herself, or from sources outside of the environment.

In the example scenario described above with reference to FIGS. 2-12, Andy's actions in preparing a sales proposal for Company X triggered the delivery of Jane's alert message. Similarly, Jane's scheduling of a meeting triggered notifications of news, both good and bad, concerning the prospective customer. Such activities and events can be determined, for instance, by observing the documents, data or software applications currently in use by other users, for instance, an appointment calendaring program.

Taking Action

Up to this point in the example scenario, we have been describing the delivery of a manually-authored message. In the case of Jane receiving news as the result of scheduling a meeting, the message (the news) is constructed dynamically by the system by fetching information about a given person, company, or topic from the (constantly changing) graph of context when the system determines that Jane is performing a particular kind of event (scheduling a meeting) with respect to a particular kind of entity (someone from a customer company). However, the system is applicable to a larger and more generalized class of actions, such as listed supra with respect to FIG. 13.

Third, action is taken (step 133). Often, a trigger will define an action by specifying the conditions under which a message will be delivered to a user. However, the action to be taken when a trigger is activated may be more general than opening or displaying a message that has been authored in advance. For example, the action taken could be to open a calendar and highlight a particular day, then automatically offer to add an event to the calendar. The action taken could also be to display the most recent message from a given person, or to display the contents of a particular project folder. Also, the action taken could be sending or displaying user-specific questionnaires on a user's device; depending upon the parameters of the activating trigger, these questionnaires could be dynamically adapted to assess a user's behavior and opinion in a more precise and fine-grained manner to ensure a correctly timed assessment of the user's information. The aim is to collect user information right at the moment when the underlying information-related activity is happing, thus providing a more fine-grained and precise assessment of the requested user information. Still other actions are possible.

Messages are delivered and, more generally, actions are taken by applying rules and best practices that are embodied in triggers through heuristics that deliver messages or take actions just-in-time to optimize their usefulness to the recipient, rather than immediately upon dispatch or specification. When the action is message delivery, messages are sent to recipients who were either specifically listed in the message header by the sender, or as identified by the system as being recipients who, although not expressly listed, would nevertheless benefit from the information conveyed by the message. The same message may be delivered as the result of multiple triggers, or the same action may be taken as a result of multiple triggers. Similarly, different messages may be delivered or different actions may be taken as a result of a single trigger. A potential recipient of the message or action to be taken may be identified by an action that causes the system to associate that recipient with one or more pre-specified documents, persons, key words, times, projects, topics, and so forth. Furthermore, that relationship may be direct, if the action is taken directly on one of these entities, or may be indirect, if the action is taken on an entity that is not itself in the list, but is strongly connected to one or more such entities via the graph of context maintained by the system, as described supra.

Each message is delivered or action undertaken at a time when receipt of the message will likely be of most value or meaning to the recipient. Message delivery is timed to maximize impact and usefulness to the recipients. In particular, message delivery can include:

(1) immediate delivery: the message is sent to the recipient right away, as performed, for instance, with conventional email or text messaging; and (2) deferred delivery: the message is temporarily stored and subsequently delivered when a triggering activity occurs. Deferred message delivery can be provided, for instance, by setting a time period during which a trigger remains active. For example, the active or inactive state of a trigger may depend upon whether a given date has past, whether the sender has withdrawn the message, whether a newer version of the message has become available, and so on. The trigger can automatically expire when the time period ends, or can be manually cancelled. Other ways to defer message delivery, including through use of an open-ended time period, are possible.

Still other types and styles of message delivery are possible.

In addition to immediate and deferred delivery, message delivery can include automatic delivery, in which the message is automatically opened for viewing when another separate-yet-related message is opened by the recipient. Automatic delivery, though, is just a special case of deferred delivery, where opening a message is the trigger. However, further variations of automatic delivery along other dimensions are possible. For example, in some configurations, the rules for message delivery may be entirely in the hands of the sender, or the recipient could be provided with more control. For instance, the recipient may wish to disable the firing of certain rules, if they produce information that is not seen as valuable. Conversely, the recipient may wish to receive messages even more often than the original rule would suggest. Such users may wish the specify a broader class of documents, items, key words, or topics that will trigger the rules. Thus, we can distinguish sender control of rules versus recipient control of rules, as well as hybrid control of rules.

In addition to timing, message delivery can be controlled by other constraints. For instance, message delivery can be prioritized or based on criteria, such as low or high precedence, as specified by the message sender or potential message recipients. Similarly, message delivery can be conditional. Other message delivery constraints are possible.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for flexibly taking actions in response to detected activities, comprising:
    a storage device in a computing environment storing a trigger comprising at least one of:
        one or more documents, persons, key words, times, and projects associable with the activities of at least one user; and
        one or more actions associable with the activities of the at least one user; and
    a message delivery platform, comprising:
        a monitor module monitoring at least one of activities, events, and stimuli occurring within the computing environment in relation to the documents, persons, key words, times, and projects, and to the activities;
        an execution module taking action within the computing environment upon activation of the trigger by the at least one activity, event, and stimulus; and
        a criteria module defining the stimuli as a criteria comprising at least one of one or more of applications used by the at least one user and connections between the documents and at least one of people, other documents, projects, times, and places within the computing environment,
    wherein the storage device stores connections between the documents, persons, key words, times, and projects within the computing environment in a graph, and the trigger is conditioned on the contents of the graph.

2. A system according to claim 1, wherein the action comprises delivering a message.

3. A system according to claim 2, wherein the execution module further comprises:
    a message delivery module and comprising at least one of:
        a visual display providing a window on the screen of the computer of at least one such recipient within which the message is displayed; and
        a message display inserting the message into a communication stream of the at least one such recipient via the computer.

4. A system according to claim 3, wherein the window that displays the message is positioned near another window on the screen of the computer of the at least one such recipient.

5. A system according to claim 3, wherein the communication stream comprises at least one of an email inbox, instant message queue, or social networking feed.

6. A system according to claim 3, wherein the message is delivered each time the trigger is activated.

7. A system according to claim 1, wherein the message delivery platform further comprises:
    a definition module defining the stimuli as a criteria comprising topics mentioned in the documents with which at least one recipient is interacting; and
    an action module identifying a set of the actions that can be performed in response to the activation of the trigger.

8. A system according to claim 1, wherein the action comprises delivering a message, further comprising establishing a contextual relationship between at least one of a document and an application in use by at least one recipient and the at least one such activity, event, and stimulus comprising a change to an attribute of an item of interest; and establishing a contextual relationship between at least one of a document and application in use by at least one recipient and the at least one such activity, event, and stimulus comprising use of data within the computing environment.

9. A system according to claim 1, wherein the action comprises delivering a message, further comprising at least one of delivering the message without deferring delivery; and deferring delivery of the message under a control of pre-set rules.

10. A system according to claim 9, wherein the deferred delivery of the message further comprises at least one of setting rules to control the deferred delivery based on criteria specified by a sender of the message; and setting rules to control the deferred delivery based on criteria specified by at least one recipient of the message, the criteria comprising one or more of disabling the activation of one or more triggers, receiving the message more often than specified in the trigger, and specifying a broader class of documents, items, key words, or topics that will activate the trigger.

11. A system according to claim 1, wherein the action comprises at least one of moving an email message to a specific message set; copying a document into one of a shared and private folder in a repository;
adding a task entry into a private task list; adding a calendar entry into one of a shared and private calendar; creating a new document, based on an appropriate template, for a recipient of a message to edit; copying a document to a device in use by a recipient of a message; delivering a message, further comprising controlling delivery through constraints selected by at least one of a sender of the message and at least one recipient of the message from the set comprising selecting triggers that activate, trigger activation frequency, message delivery priority, message delivery precedence, and conditional criteria applicable to the message; and sending a questionnaire, comprising controlling delivery by constraints selected from conditional criteria; and adapting content of the questionnaire content based on the trigger.

12. A system according to claim 1, further comprising identifying a recipient of a message or an action by a separate action within the computing environment that forms a relationship between the recipient with one or more pre-specified documents, persons, key words, times, projects, and topics, wherein the relationship is one of direct when the action is taken directly on at least one of the pre-specified documents, persons, key words, times, projects, and topics, and indirect when the action is taken on an entity connected by a path comprising at least one connected edge of a graph of context with the pre-specified documents, persons, key words, times, projects, and topics.

13. A computer-implemented method for flexibly taking actions in response to detected activities, comprising:
defining a trigger maintained in a storage device of a computing environment comprising at least one of:
specifying one or more documents, persons, key words, times, and projects associable with the activities of at least one user; and
defining one or more actions associable with the activities of activities of the at least one user;
monitoring with a processor at least one of activities, events, and stimuli occurring within the computing environment in relation to the documents, persons, key words, times, and projects, and to the activities; taking action within the computing environment upon activation of the trigger by the at least one activity, event, and stimulus;
defining the stimuli as a criteria comprising at least one of:
identifying one or more of applications used by the at least one user; and
identifying connections between the documents and at least one of people, other documents, projects, times, and places within the computing environment;
representing connections between the documents, persons, key words, times, and projects within the computing environment in a graph; and
conditioning the trigger on the contents of the graph.

14. A method according to claim 13, wherein the action comprises delivering a message.

15. A method according to claim 14, further comprising:
performing at least one of:
displaying the message in a window on the screen of the computer of at least one such recipient; and
inserting the message into a communication stream of the at least one such recipient via the computer.

16. A method according to claim 15, wherein the window that displays the message is positioned near another window on the screen of the computer of the at least one such recipient.

17. A method according to claim 15, wherein the communication stream comprises at least one of an email inbox, instant message queue, or social networking feed.

18. A method according to claim 15, wherein the message is delivered each time the trigger is activated.

19. A method according to claim 13, further comprising:
defining the stimuli as a criteria comprising
identifying topics mentioned in the documents with which at least one recipient is interacting; and
identifying a set of the actions that can be performed in response to the activation of the trigger.

20. A method according to claim 13, wherein the action comprises delivering a message, further comprising:
establishing a contextual relationship between at least one of a document and an application in use by at least one recipient and the at least one such activity, event, and stimulus comprising a change to an attribute of an item of interest; and
establishing a contextual relationship between at least one of a document and application in use by at least one recipient and the at least one such activity, event, and stimulus comprising use of data within the computing environment.

21. A method according to claim 13, wherein the action comprises delivering a message, further comprising at least one of:
delivering the message without deferring delivery; and
deferring delivery of the message under a control of pre-set rules.

22. A method according to claim 21, wherein the deferred delivery of the message further comprises at least one of:
setting rules to control the deferred delivery based on criteria specified by a sender of the message; and
setting rules to control the deferred delivery based on criteria specified by at least one recipient of the message, the criteria comprising one or more of disabling the activation of one or more triggers, receiving the message more often than specified in the trigger, and specifying a broader class of documents, items, key words, or topics that will activate the trigger.

23. A method according to claim 13, wherein the action comprises at least one of:
moving an email message to a specific message set;
copying a document into one of a shared and private folder in a repository;
adding a task entry into a private task list;
adding a calendar entry into one of a shared and private calendar;
creating a new document, based on an appropriate template, for a recipient of a message to edit;

copying a document to a device in use by a recipient of a message;

delivering a message, further comprising:

controlling delivery through constraints selected by at least one of a sender of the message and at least one recipient of the message from the set comprising selecting triggers that activate, trigger activation frequency, message delivery priority, message delivery precedence, and conditional criteria applicable to the message; and sending a questionnaire, comprising:

controlling delivery by constraints selected from conditional criteria; and adapting content of the questionnaire content based on the trigger.

24. A method according to claim 13, further comprising:

identifying a recipient of a message or an action by a separate action within the computing environment that forms a relationship between the recipient with one or more pre-specified documents, persons, key words, times, projects, and topics, wherein the relationship is one of direct when the action is taken directly on at least one of the pre-specified documents, persons, key words, times, projects, and topics, and indirect when the action is taken on an entity connected by a path comprising at least one connected edge of a graph of context with the pre-specified documents, persons.

* * * * *